United States Patent
Mariels

(10) Patent No.: US 8,093,862 B2
(45) Date of Patent: Jan. 10, 2012

(54) SYSTEMS, APPARATUS AND METHODS FOR BATTERY CHARGE MANAGEMENT

(75) Inventor: Nathan Mariels, Oakland, CA (US)

(73) Assignee: Modalis Engineering, Inc., Oakland, CA (US)

( * ) Notice: Subject to any disclaimer, the term of this patent is extended or adjusted under 35 U.S.C. 154(b) by 620 days.

(21) Appl. No.: 12/324,691

(22) Filed: Nov. 26, 2008

(65) Prior Publication Data

US 2010/0052614 A1   Mar. 4, 2010

Related U.S. Application Data

(60) Provisional application No. 61/094,020, filed on Sep. 3, 2008.

(51) Int. Cl.
*H02J 7/00* (2006.01)

(52) U.S. Cl. ......... 320/116; 320/119

(58) Field of Classification Search ......... 320/116, 320/119
See application file for complete search history.

(56) References Cited

U.S. PATENT DOCUMENTS

| | | |
|---|---|---|
| 5,656,915 A | 8/1997 | Eaves |
| 6,700,350 B2 | 3/2004 | Formenti et al. |
| 2006/0026822 A1 | 2/2006 | Seman et al. |

*Primary Examiner* — Bot Ledynh
(74) *Attorney, Agent, or Firm* — Perkins Coie LLP

(57) ABSTRACT

Systems, apparatus, and methods for automobile battery management is provided. In one embodiment, an apparatus for providing balanced and individualized charging to a battery pack is provided. The apparatus uses microcontrollers to determine a charge level of the batteries, and correspondingly controls a power balancer to apply a charge current to the battery in relation to the charge level, and dissipates the remaining charge current as heat energy. In one embodiment, a system controller controls a balanced charging operation of the battery system, provides an interface for a user to monitor cell-level parameters, and protects the battery cells from undercharging or overcharging during the charging or discharging operations.

18 Claims, 7 Drawing Sheets

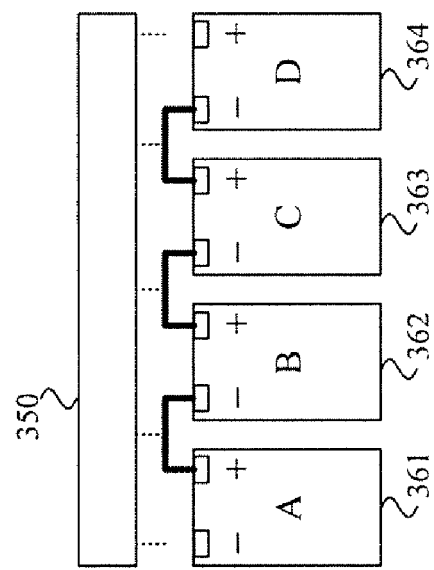
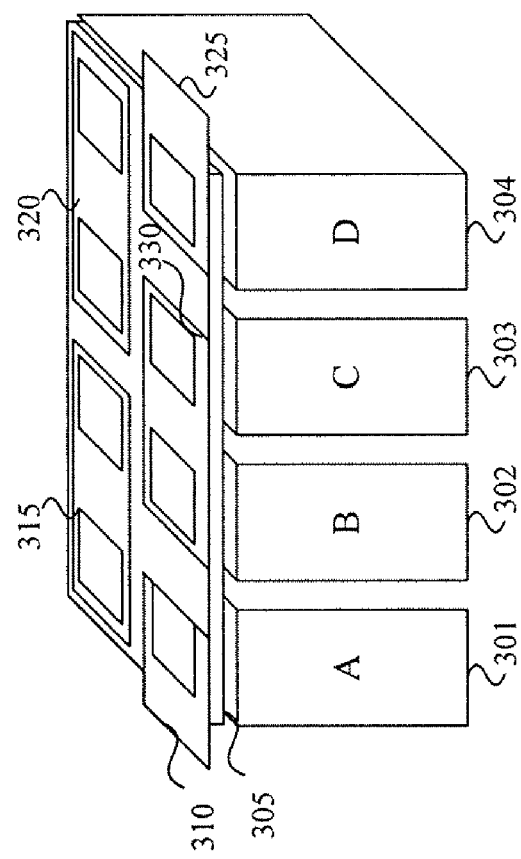

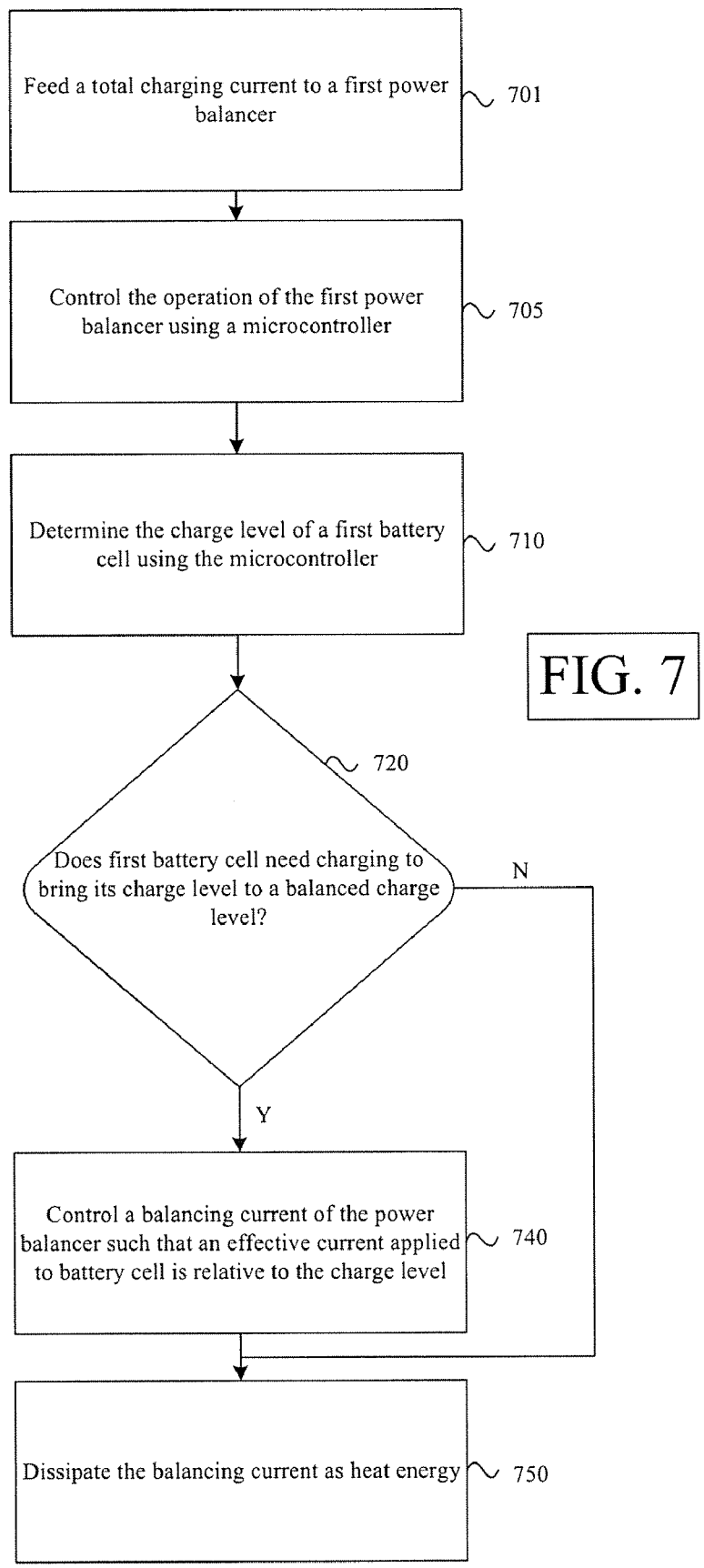

SYSTEMS, APPARATUS AND METHODS FOR BATTERY CHARGE MANAGEMENT

CROSS REFERENCE TO RELATED APPLICATIONS

This application claims benefit from U.S. Provisional Application No. 61/094,020, entitled APPARATUS AND METHODS FOR AUTOMOBILE BATTERY MANAGEMENT, by Nathan Mariels, filed Sep. 3, 2008, which is hereby incorporated by reference in its entirety.

FIELD OF INVENTION

The present invention relates to control systems and more specifically it relates to battery charging methods and apparatuses, and especially to charging battery arrays having a plurality of battery cells.

BACKGROUND OF THE INVENTION

A rechargeable battery, also known as a storage battery, is a group of two or more secondary cells. These batteries can be restored to full charge by the application of electrical energy. In other words, they are electrochemical cells in which the electrochemical reaction that releases energy is readily reversible. Rechargeable electrochemical cells are therefore a type of accumulator. They come in many different designs using different chemicals. Commonly used secondary cell chemistries are lead and sulfuric acid, rechargeable alkaline battery (alkaline), nickel cadmium (NiCd), nickel metal hydride (NiMH), lithium ion (Li-ion), and lithium ion polymer (Li-ion polymer).

Rechargeable batteries can offer economic and environmental benefits compared to disposable batteries. Some rechargeable battery types are available in the same sizes as disposable types. While the rechargeable cells typically have a higher first cost than disposable batteries, rechargeable batteries can be discharged and recharged many times. Proper selection of a rechargeable battery system can reduce toxic materials sent to landfill disposal compared to an equivalent series of disposable batteries. Some manufacturers of NiMH type rechargeable batteries claim a lifespan up to 3000 charge cycles for their batteries.

Lead-acid batteries, invented in 1859, are the oldest type of rechargeable battery. The lead-acid batteries have a large energy-to-weight ratio and a correspondingly large energy-to-volume ratio, and therefore are able to supply high surge currents means while maintaining a relatively large power-to-weight ratio. These features, along with their low cost, make them attractive for use in automobiles, to provide the high current required by automobile starter motors.

The Lithium-ion ("Li-ion") battery is another type of rechargeable battery in which a lithium ion moves between the anode and cathode. The lithium ion moves from the anode to the cathode during discharge and from the cathode to the anode when charging. Lithium ion batteries are commonly used in consumer electronics. They are particularly advantageous for portable electronics because the Li-ion batteries have one of the best energy-to-weight ratios, have no memory effect, and have a slow loss of charge when not in use. In addition to uses for consumer electronics, lithium-ion batteries are growing in popularity for defense, automotive, and aerospace applications due to their high energy density.

The Li-ion batteries have a significantly better power-to-weight ratio than the lead-acid batteries and would therefore be a better choice where traditional lead-acid applications (such as automotive batteries) are used. However, Li-ion batteries are not widely used in such other systems because of two problems. The first problem is that the Li-ion batteries need individual charge control, and the second problem is that the Li-ion batteries require cell balancing. Li-ion battery cells require careful charge management to ensure that significant over-charge and over-discharge does not occur. This is because Li-ion batteries possess an extreme sensitivity to overcharging and over-discharging not found in most other types of batteries.

Cell balancing is defined as the application of differential currents to individual cells (or combinations of cells in a battery pack) in a series string. Normally, cells in a series string receive identical currents. A battery pack therefore requires additional components and circuitry to achieve cell balancing. Battery pack cells are balanced when all the cells in the battery pack meet two conditions:

1. If all cells have the same capacity, then they are balanced when they have the same relative State of Charge (SOC.) In this case, the Open Circuit Voltage (OCV) is a good measure of the SOC. If, in an out of balance pack, all cells can be differentially charged to full capacity (balanced), then they will subsequently cycle normally without any additional adjustments.

2. If the cells have different capacities, they are also considered balanced when the SOC is the same. But, since SOC is a relative measure, the absolute amount of capacity for each cell is different. To keep the cells with different capacities at the same SOC, cell balancing must provide differential amounts of current to cells in the series string during both charge and discharge on every cycle.

Because of the need for individual charge control and cell balancing, the Li-ion batteries are not preferred in high volume systems (e.g., automotive batteries) despite offering a higher power-to-weight ratio than the batteries used in prior art (e.g., the lead acid batteries). Additionally, Li-ion batteries are highly susceptible to permanent damage in the events of high temperature, over-charging, and over-draining. Therefore, these parameters need to be carefully monitored.

SUMMARY OF THE INVENTION

Systems, apparatus, and methods for battery charge management is provided. In one embodiment, an apparatus for providing balanced and individualized charging to a plurality of battery cells is provided. The apparatus comprises a plurality of power balancers to regulate the amount of effective current applied to each of the battery cells. A microcontroller determines a charge level of each of the battery cells and computes the amount of current that needs to be effectively applied to each of the battery cells to achieve charge balance.

The microcontroller controls the plurality of power balancers to vary a balancing current within the plurality of power balancers. By varying the balancing current of each of the plurality of power balancers, only a portion of a total charging current is applied as effective charging current to each of the plurality of battery cells. The balancing current of each of the plurality of power balancers is dissipated as heat energy using heat sinks associated with each of the plurality of power balancers. This provides a cost-effective and efficient way of charging battery cell packs that require individualized and balanced charge control.

In one embodiment, the microcontroller is a PID controller, implementing PID algorithms to control the balanced charging operations. In some instances, the power balancer is a power transistor operating in linear mode. Examples of the battery cells used in conjunction with this invention include Lithium-Ion battery cells, Nickel-Zinc battery cells, Nickel Metal Hydride battery cells, Lead-acid battery cells, etc. In one embodiment, each of the plurality of battery cells is connected in series. In some instances, the plurality of battery cells is assembled such that they can easily replace existing battery cell configurations in motor vehicles.

A system for battery management in motor vehicles is provided. The battery management system comprises a charge balancer to provide balanced charging to a plurality of battery cells. The charge balancer uses a microcontroller to control a plurality of power balancers to apply an effective charging current relative to a charge level of each battery cell. In one embodiment, the microcontroller is a PID controller. In one embodiment, a plurality of microcontrollers to perform a variety of operations, including monitoring current, voltage, and charge rate of each of the plurality of battery cells, monitoring temperature of the battery packs, controlling balancing currents of the plurality of power balancers, etc.

In some instances, the battery management system includes a system controller to control the overall operations of the battery management system. The system controller, in one embodiment, includes a current charger controller to prevent an external charger from supplying current to the charge balancers when any of the plurality of battery cells exceeds established parameter levels (e.g., voltage of a particular battery cell exceeding a threshold value, etc.). In some instances, the current charge controller cycles the charge current from the external charger when the power needed by one or battery cells exceeds the heat dissipation limit of the heat sink(s) associated with the one or more battery cells.

In one embodiment, the system controller logs all cell parameter information from the various balancing chargers. In some instances, the system controller provides an interface to connect to an external computer, enabling a user to monitor, log, and set/reset cell level parameters.

The system controller, in one embodiment, enables power from the plurality of battery cells to be conveyed to a motor controller of the motor vehicle. In some instances, the system controller disables the power from the plurality of battery cells to be conveyed to the motor controller if any of the battery cells exceeds established parameter levels (e.g., over temperature, voltage of a particular battery cell goes below a threshold value, etc.). These various mechanisms of the system controller thus prevent the battery cells from suffering permanent damage due to over charging or undercharging.

In one embodiment, the system controller includes a throttle controller to control a throttle of the motor vehicle to gradually reduce the amount of power delivered to the motor controller when the overall power from the plurality of battery cells reduces below a predetermined value.

Further objects and features of the present invention will be apparent from the following specification and claims when considered in connection with the accompanying drawings, in which like elements are labeled using like reference numerals in the various figures, illustrating the preferred embodiments of the invention.

FIGURES

These and other objects, features and characteristics of the present invention will become more apparent to those skilled in the art from a study of the following detailed description in conjunction with the appended claims and drawings, all of which form a part of this specification. In the drawings:

FIG. 3A depicts one embodiment of a group of battery cells;

FIG. 3B depicts in planar view an embodiment of a group of battery cells connected to one charge balancer;

FIG. 7 is a flow chart illustrating a method for individualized charging of multiple battery cells.

DETAILED DESCRIPTION OF THE INVENTION

The present invention may be embodied in several forms and manners. The description provided below and the drawings show exemplary embodiments of the invention. Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

Figure 1:
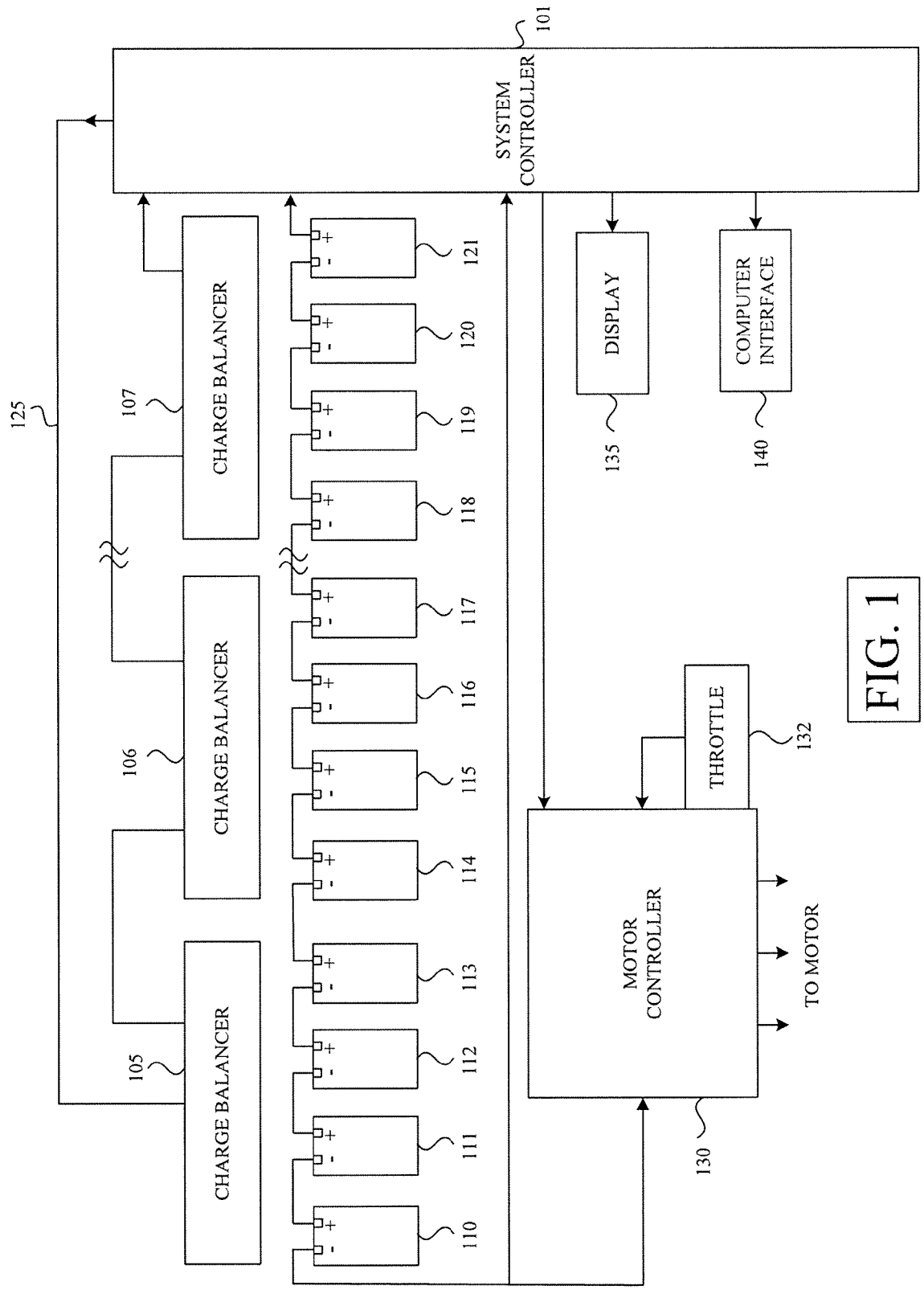
FIG. 1 is a block diagram depicting an overall system configuration of an automobile battery management system.

FIG. 1 is a block diagram depicting an overall system configuration of a battery management system for a motor vehicle. In one embodiment, the battery management system uses one or more battery cells (e.g., 110-121). In some instances, the battery cells are connected, for example, in groups of four cells, as shown in FIG. 1 (e.g., battery cells 110, 111, 112, and 113). Here, each group of battery cells is connected to a charge balancer (e.g., 105, 106, 107). In one embodiment, the charge balancer controls a balanced and individualized charging of each of the battery cells the balancer is connected to. It is noted here that the embodiment showing one charge balancer for a group of four battery cells is for the purpose of illustration. It will be apparent to a person skilled in the art that a group of battery cells controlled by a charge controller can include a different number of battery cells. The group, in some instances, can even include just one battery cell.

In one embodiment, a first charge balancer (e.g., 105) can be connected to a second charge balancer (e.g., 106) by connecting them, for example, in series using board-to-board ("B2B") connection components. Detailed description of the various components of the board, including the B2B connection components, is provided further below. In some instances, the battery cells are connected in series within a single group (e.g., 110-113). Additionally, in some instances, the last battery cell in a first group is connected to a first battery cell in a second group by means of a series connection.

In addition to providing the electrical connections, the charge balancers, in some instances, include an interconnect 125 for communicating with a main system controller 101. The interconnect 125 may include, for example, a system bus, a Peripheral Component Interconnect (PCI) bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus. In one embodiment, the interconnect 125 transmits data from the charge balancer (e.g., 105) to the system controller, and also transmits control operations from the system controller 101 to each of the charge balancers (e.g., 105).

The system controller 101, in some instances, is responsible for controlling the charge operations of the battery management system. In some cases, the system controller 101 controls each of the charge balancers (e.g., 105). In one example, the system controller 101 monitors the voltage and current levels of each of the battery cells (e.g., 110) connected through the charge balancers (e.g., 105). The system controller 101, in some instances, also controls the supply of power from the battery cells to a subsequent motor controller 130 of a motor vehicle. In some instances, the system controller 101 controls a throttle 132 of the motor controller 130 in response to an available amount of charge in the battery cells. Such operations are discussed in greater detail further below with reference to FIG. 6.

The system controller, in some embodiments, includes one or more processors or microcontrollers to perform a variety of functions. The processor(s) may include central processing units (CPUs) to control the overall operation of, for example, the charge balancers (e.g., 105). In certain embodiments, the processor(s) accomplish this by executing software or firmware stored in memory. The processor(s) may be, or may include, one or more programmable general-purpose or special-purpose microprocessors, PID controllers, digital signal processors (DSPs), programmable controllers, application specific integrated circuits (ASICs), programmable logic devices (PLDs), or the like, or a combination of such devices.

The memory is or includes the main memory of the computer system. The memory represents any form of random access memory (RAM), read-only memory (ROM), flash memory or the like, or a combination of such devices. In use, the memory may contain, among other things, a set of machine instructions which, when executed by processor, causes the processor to perform operations to implement the various operations of the present invention.

In some instances, the system controller 101 connects to a display 135. The display, in one embodiment, provides statistics of, for example, charge levels of the various battery cells. The display could be, for example, a series of LEDs, an LCD display device, a printing device, etc. Additionally, in one embodiment, the system controller 101 has a computer interface 140 to enable an external computer to access the system controller 101. The computer interface 140, in some instances, is a serial interface (e.g., RS232 standard interface). In other instances, the computer interface is an Ethernet network interface.

Figure 2:
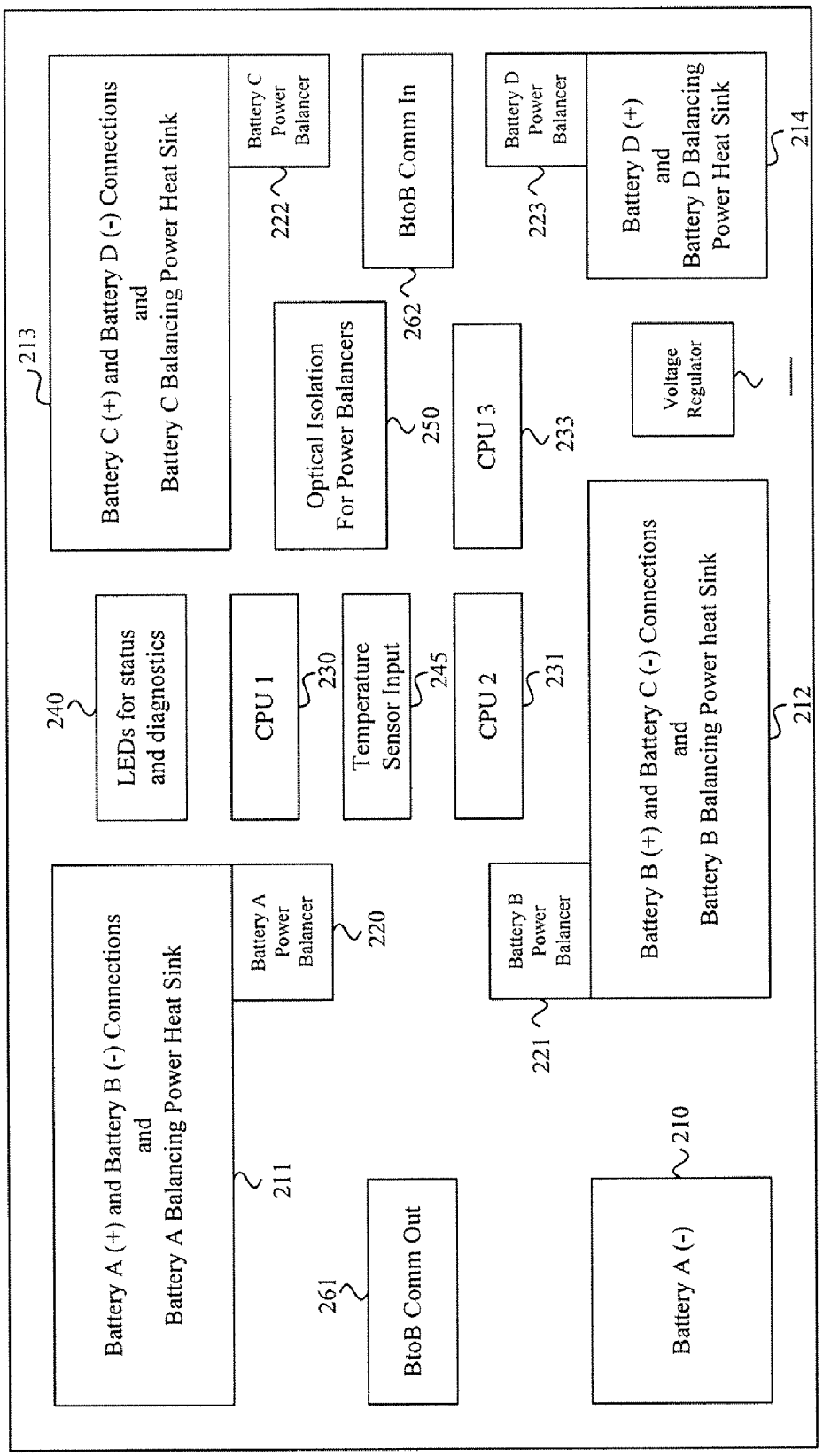
FIG. 2 is a block diagram illustrating one embodiment of a charge balancer.

FIG. 2 is a block diagram illustrating one embodiment of a charge balancer. In some instances, the charge balancer is constructed by building the various components on a printed circuit board (PCB). The usage and placement of the various components in FIG. 2 is for illustrative purposes. It is understood that other orientations and placement options, serving the purpose of individualized and balanced charge control as discussed here, are equally applicable. Additionally, the operation of the charge balancer is described here as used for a group of four battery cells. It is understood that the charge balancer discussed herein can be extended to include a lesser or higher number of battery cells.

In one embodiment, the charge balancer is built such that it provides balanced and individualized charging for a group of four battery cells: cell A, cell B, cell C, and cell D (the battery cells are not shown in FIG. 2). Cells A, B, C, and D are electrically connected to the charge balancer by means of, for example, heat sink plates (e.g., 210). For example, heat sink plate 210 provides an electrical connection to a negative terminal of cell A. Heat sink plate 211 provides an electrical connection to a positive terminal of cell A and also to a negative terminal of cell B. By providing a single heat sink plate (211) for the positive terminal of A and the negative terminal of B, cells A and B are connected in series. Similarly, heat sink plate 212 provides an electrical connection to a positive terminal of cell B and a negative terminal of cell C, connecting cells B and C in series. Further, heat sink plate 213 provides an electrical connection to a positive terminal of cell C and a negative terminal of cell D, connecting cells C and D in series. Finally, heat sink plate 214 provides an electrical connection to a positive terminal of cell D.

In one embodiment, the heat sink plates are also used to connect the group of cells to a second group of cells. For example, heat sink plate 214 can be used to connect to a second charge balancer, with a connection to a negative terminal of cell A of the second group of battery cells. The heat sink plates, in one embodiment, are copper plates that are able to provide electrical conduction to the terminals of the battery cells. Also, the heat sink plates act as power heat sinks to dissipate heat energy generated during the charging process. Other materials known to people skilled in the art to provide electrical conduction and heat sinking capability are equally applicable here.

In one embodiment, each of the heat sink plates is combined with a power balancer (e.g., 220). The combination of the heat sink plate and the power balancer regulates an effective charging current within each of the battery cells. In some instances, the power balancer is a transistor. Examples of such transistors include a power transistor. In one example, an epitaxial NPN transistor is used in linear mode, where the epitaxial transistor also has a heat sink terminal. In other instances, the power balancer could be a power resistor. However, power transistors operating in linear mode are more suited for the charge balancers owing to their sturdiness in working in high temperature environments.

In some embodiments, the charge balancer has one or more microcontrollers (e.g., 230) to at least control the operation of the power balancers. In one embodiment, the microcontroller is a PID controller that implements PID algorithms to control the operation of the charge balancer. In some instances, the operations of the microcontroller can be split by having a multiple number of microcontrollers (e.g., 230, 231, 232) to perform various operations of the charge balancer. In other instances, a single microcontroller can be used to perform the functions of the charge balancer.

In some instances, the microcontroller measures the voltage and current levels in each of the battery cells and computes a required amount of charging current and charging rate for each of the battery cells. The microcontroller, in one embodiment, controls the operation of each of the power balancers such that each of the battery cells is charged individually in proportion to a charge level of the battery cells. The balanced and individualized charging process is discussed in greater detail with reference to FIGS. 4-5 below.

The charge balancer, in certain embodiments, includes a temperature sensor 245. The temperature sensor 245, in some instances, is connected to the core or the common container of the battery cells such that the temperature sensor 245 records an overall temperature of the group of battery cells. In other instances, a multiple number of temperature sensors (e.g., 245) may be placed to record the temperature individually from each of the battery cells.

The charge balancer has a voltage regulator 255 designed to provide a required amount of voltage for the operation of the charge balancer. The voltage regulator 255, in some instances, derives power from an external power supply, and brings down the external voltage to a predetermined level.

The selection of the predetermined level depends on several factors including the type of battery cell used, the number of battery cells grouped together, the operable region of the power balancers, the requirement of the microcontrollers, etc.

Additionally, in some instances, the charge balancer contains an optical isolator 250. The optical isolator 250, in some instances, operates as a safety feature to isolate the microcontroller from the power balancers. For example, when one or more of the power balancers fail (e.g., due to excess heat that is not dissipated through the heat sinks, due to voltage spikes, etc.), the optical isolator 250 isolates the fault and prevents it from reaching the microcontrollers (e.g., 230).

The charge balancers also include, in some instances, B2B communication components (e.g., 261, 262). As discussed before, in one embodiment, the charge balancers communicate with an external system controller to, for example, report status of the battery cells. The charge balancers communicate with the external system controller using a bus, and the B2B communication components (261, 262) provide access to the bus connection.

FIG. 3A depicts one embodiment of a group of battery cells. Here, four battery cells, including cell A 301, cell B 302, cell C 303, and cell D 304, are connected in series to form a battery cell group. In one embodiment, the battery cell group is controlled and operated using one charge balancer 305. The charge balancer 305, as explained above, contains heat sink connectors to connect the battery cells in, for example, a series connection. Here, 310 is a first heat sink connector connecting to a negative terminal of battery cell A 301. 315 connects between a positive terminal of cell A 301 and a negative terminal of cell B 302. Similarly, 330 connects between a positive terminal of cell B 302 and a negative terminal of cell C 303. 320 connects between a positive terminal of cell C 303 and a negative terminal of cell D 304. 325 connects to a positive terminal of cell D 304. As indicated before, the connections can be extrapolated to include a different number of battery cells in each group.

FIG. 3B depicts in planar view an embodiment of a group of battery cells connected to one charge balancer. Here, cell A 361, cell B 362, cell C 363, and cell D 364 are connected in series and connected to a charge balancer 350. The battery cells (e.g., 361, 362, 363, and 364) include Lithium-Ion ("Li-ion") battery cells. Other examples of battery cells that work in conjunction with the present invention include Nickel-metal Hydride ("NiMH") cells, Nickel-Zinc ("NiZn") cells, etc. The charge balancer 350 can also operate on existing Lead-Acid battery cells. Other types of battery cells known to people skilled in the art that operate to provide power in motor related applications are equally applicable here. Furthermore, in some embodiments, individual battery cells are grouped such that the battery cell group, along with the charge balancer can easily replace existing Lead-Acid (or other existing battery types) battery cells installed in a motor vehicle.

Figure 4:
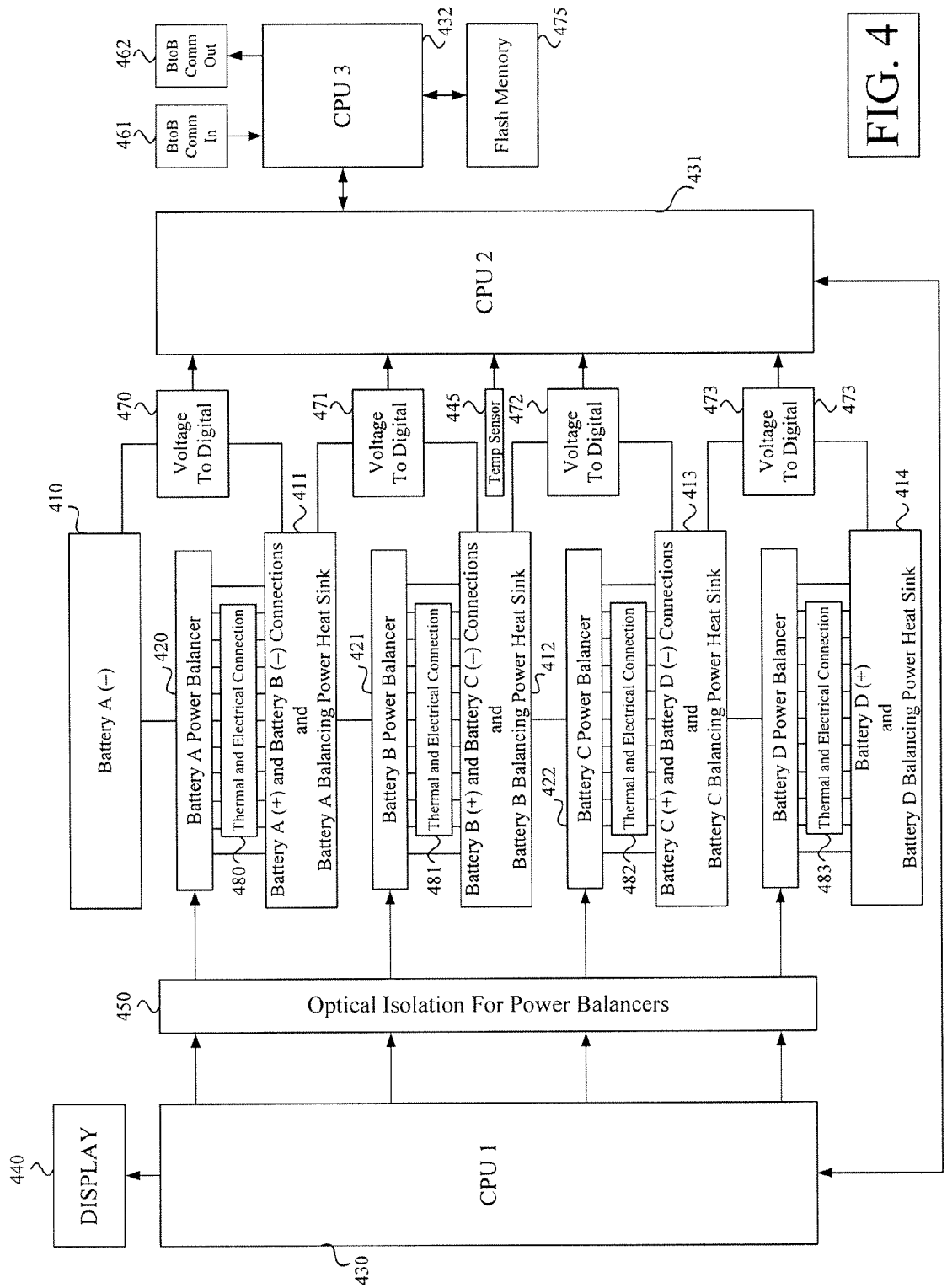
FIG. 4 is a schematic diagram depicting the connection of the various components of one embodiment of a charge balancer.

FIG. 4 is a schematic diagram depicting the connection of the various components of one embodiment of a charge balancer. As indicated above, in some instances, the charge balancer has multiple heat sink connector plates (e.g., 410, 411, 412, 413, and 414) to provide electrical connection to each of the battery cells. In one embodiment, multiple microcontrollers (e.g., 430, 431, 432) are used for various functions within the charge balancer. It is understood, as discussed above, that the operations of the three microcontrollers could be performed using a single microcontroller or by using additional number of microcontrollers. Additionally, in the embodiment discussed here, the microcontrollers (e.g., 430, 431, 432) are PID controllers that implement PID algorithms to perform the various operations of the charge balancer.

Each of the battery cells (not shown in FIG. 4) is connected to a combination of heat sink electrical connectors (e.g., 410-414) and power balancers (e.g., 420, 421, 422, 423). The combination utilizes thermal and electrical connections (e.g., 480, 481, 482, 483) to connect to each of the battery cells. Each of the thermal and electrical connections (e.g., 480) establishes an electrical connection between the combination of heat sink connector plate (e.g., 411) and the power balancer (e.g., 420) to each of the battery cells. The thermal connection enables any heat energy generated during the charging process to be dissipated.

The charge balancer, in one embodiment, uses three PID controllers to implement several operations. In one instance, a first PID controller 430 provides power balancing control to each of the battery cells. In one embodiment, the first PID controller 430 collects information about the charge level of each of the battery cells. The first microcontroller 430 determines how each of the battery cells should be charged and thus balances the charge level on the entire group of battery cells based on the charge level of each of the individual battery cells. Corresponding to this determination, the first microcontroller 430 controls each of the power balancers (e.g., 420) to control the amount of effective charging current applied to each of the battery cells. Detailed description on the operation of the power balancer to provide the effective charging current is discussed with reference to FIG. 5 below.

As discussed above, the first microcontroller 430 is, in some instances, connected to the power balancers (e.g., 420) through an optical isolator 450. The optical isolator 450 prevents a malfunction from the power balancers (e.g., a voltage spike, or excessive heat) to propagate to the first PID controller 430 or to the rest of the charge balancer. Thus, even if one or more power balancers malfunction or become inoperative, the power balancing operations of the first PID controller 430 are not affected. In one embodiment, the first PID controller also controls one or more indicators (e.g., 440) that display the status of the battery cells and provide other diagnostic information from the charge balancer. The status indicator 440, in some examples, is a series of light emitting diodes. Other display indicators known to people skilled in the art are readily applicable here.

The charge balancer, in some embodiments, includes a second PID controller 431 to perform a different set of operations. For example, the second PID controller 431 controls a temperature sensor 445 to record the temperature of the battery cells. In another example, the second PID controller 431 records the voltage and current values of each of the battery cells. In some instances, the second PID controller 431 provides the current and voltage values to the first PID controller 430 to enable the first PID controller 430 to perform the power balancing operations. In some embodiments, a set of analog to digital converters (e.g., 470, 471, 472, 473) connected to the battery cells convert the analog cell parameter values (e.g., cell voltage, cell current, temperature, etc.) to a digital value for transmission to the second PID controller 431.

In some embodiments, the charge balancer utilizes a third PID controller 432 to perform a third set of operations. The third PID controller 432, in some instances, communicates with the first PID controller 430 and the second PID controller 431 to receive data (e.g., cell parameter values) and store the data in, for example, a flash memory 475 available on the charge balancer. The third PID controller 432, in some instances, provides B2B communication interface (e.g., 461, 462) to enable the charge balancer to communicate with, for example, a system controller. As discussed above, it is understood that the implementation of the charge balancer as shown in FIG. 4 is for illustrative purposes only. Other combinations of the components discussed in FIG. 4 to achieve the principles of the present invention will be apparent to people skilled in the art.

Figure 5:
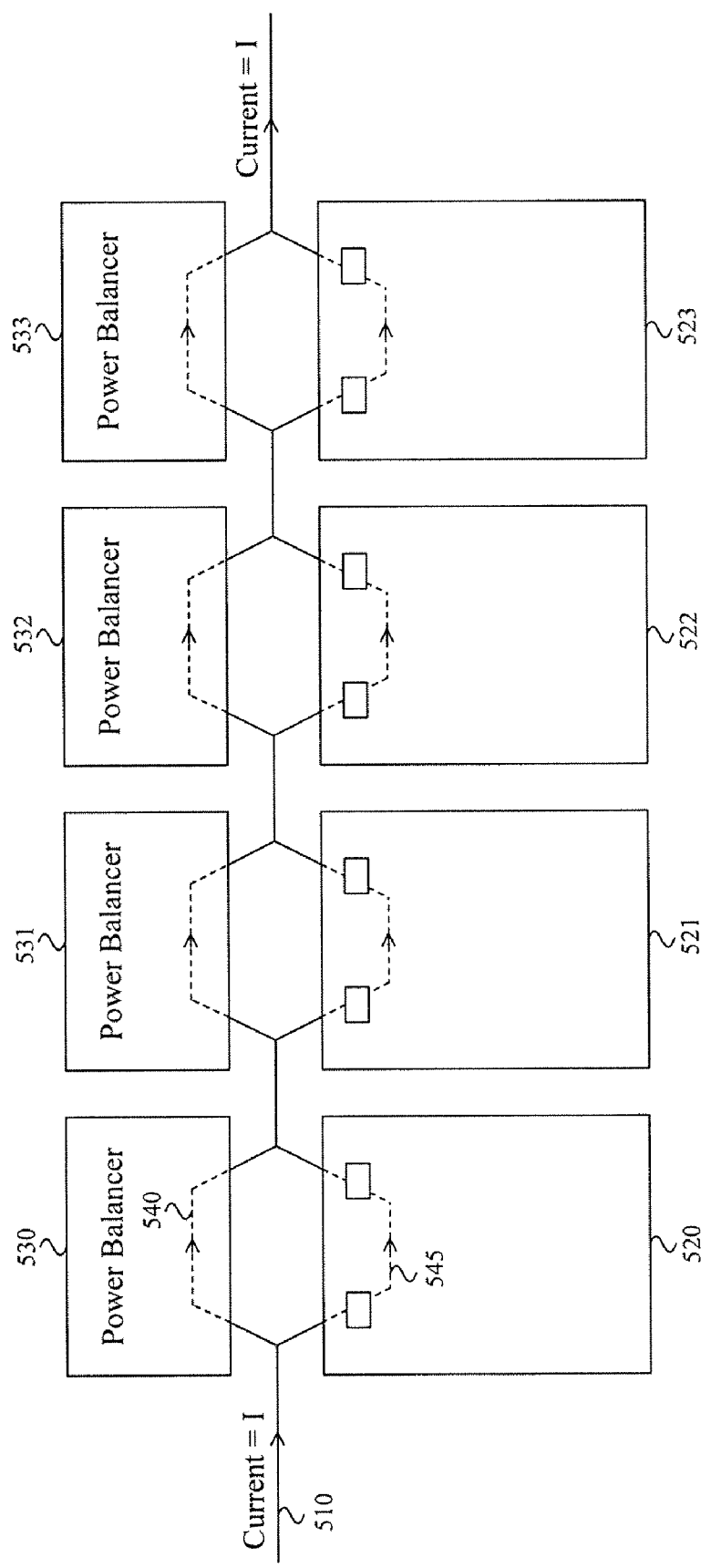
FIG. 5 is a block diagram illustrating an example of the charge balancing operation.

FIG. 5 is a block diagram illustrating an example of the charge balancing operation. In one embodiment, the charge balancer operates on a group of four battery cells (520, 521, 522, 523). The charge balancer has power balancers (e.g., 530, 531, 532, 533) to control the effective amount of power supplied to each of the battery cells. For a particular battery cell (e.g., 520), a heat sink connector (not shown) and a power balancer (e.g., 530) operate in a combination to provide balanced and individualized charge to the particular battery cell 530.

In one embodiment, the combination of the heat sink connector and the power balancer 530 receive a charge current 510 from an external charging source. The total current entering the power balancer 530 and the battery cell 520 through the heat sink connector is equal to the incoming charge current 510. However, a microcontroller (e.g., 430 in FIG. 4) monitors a current charge level of the battery cell 520 and directs the power balancer 530 to control the effective charge current 545 of the battery cell 520 to charge it only to the level required to achieve an overall balance charge. The overall balance charge, in some instances, is a common charge value shared by a group of battery cells (520, 521, 522, 523) when all the battery cells in the group (520, 521, 522, 523) are charged to an optimal level.

The power balancer 530, in some instances, generates a balancing current 540. The balancing current 540 is generated in response to the stimulus the power balancer 530 receives from, for example, a PID controller. The sum of the balancing current 540 and the effective charging current 545 applied to the battery cell 520 is equal to the incoming charge current 510. In some instances, the PID controller varies the balancing current 540 by an amount in relation to the charge current required by the battery cell 520 to reach the overall balance charge. As the balancing current 540 becomes higher, the effective charging current 545 applied to the battery cell 520 becomes lesser. The effective charging current 545 charges the battery cell 520 to enable the battery cell 520 to reach the overall balance charge level.

The balancing current 540 of the power balancer 530 is transferred as heat. In some instances, the balancing current 540 is dissipated as heat energy through the heat sink connectors. In one embodiment, the heat sink connectors dissipate the heat through battery jumpers corresponding to each of the battery cells. This removes the need for additional heat sinks to dissipate the heat generated by the power balancer 530. Therefore, by varying the balancing current of each power balancer, each battery cell is controlled and charged individually.

In some instances, a battery jumper (not shown in FIG. 5) is used with each of the power balancers (530-533) to enable the heat energy to be dissipated. In such instances, the battery jumper behaves as a heat sink. The battery jumper, in such cases, provides heat sinking capability to outsource the heat energy generated by the power balancers.

Figure 6:
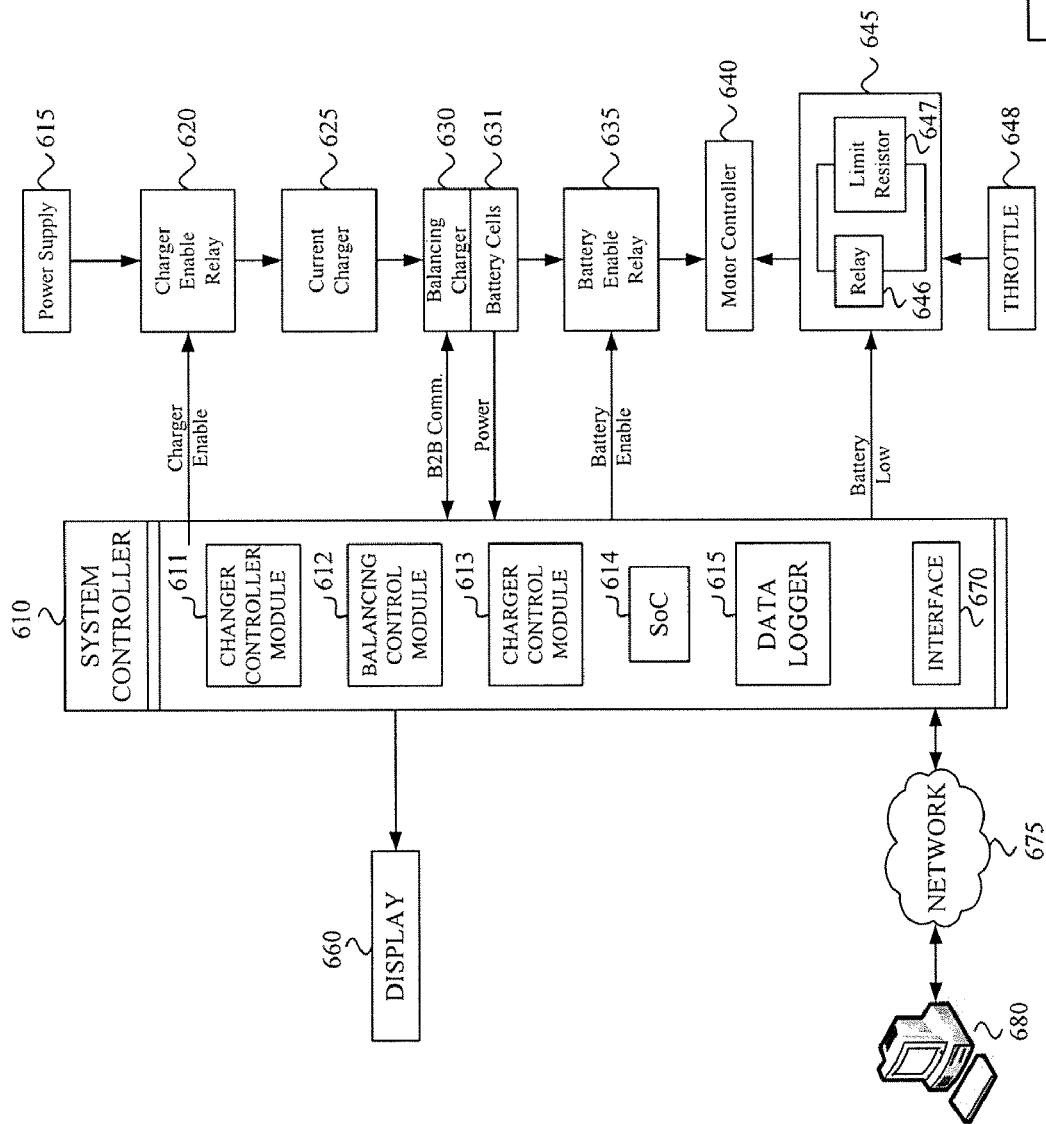
FIG. 6 is an example of one embodiment of a battery management system for use in a motor vehicle.

FIG. 6 is an example of one embodiment of a battery management system for use in a motor vehicle. A system controller 610 controls the overall operations of the battery management system. The system controller 610 controls one or more balancing chargers (e.g., 630). The balancing chargers receive a charge current from an external current charger 625 and charge the battery cells 631 in a balanced and individualized manner. The external current charger 625 receives power from a power source 615, for example an 110V AC power from an industrial or domestic power outlet.

After the battery cells 631 are charged to a balanced charge level, the battery cells supply power to a motor controller 640 of a motor vehicle. In some embodiments, the motor controller 640 is an existing component of the motor vehicle. The motor controller 640 is connected to a throttle component 648 that controls the amount of power fed to the motor vehicle through the motor controller 640. The system controller 610 controls at least all of these operations, as discussed below.

In one embodiment, the system controller 610 includes a balancing control module 612. The balancing control module 612 communicates with the charge balancers (e.g., 630) to receive information about various battery cell parameters. Examples of the battery cell parameters include voltage levels of each battery cell, current values of each battery cell, charge rates of each battery cell, temperature values of the battery cells, etc. In some instances, the balancing control module 612 of the system controller uses a predictive State of Charge ("SoC") to determine the charge rate of each battery cell. Using this information, the system controller 610 controls the charge balancers (e.g., 630) of the battery cells (e.g., 631) to enable the external charger 625 to charge the battery cells at full rate. The system controller 610 enables the full charge rate without exceeding or cycling battery limits, and fully charges the battery cells after two or three cycles.

In one embodiment, a charger enable relay 620 is placed between the power supply 615 and the external current charger 625. In some instances, the system controller 610 comprises a charge control module 611 that controls the charger enable relay 620. The charger enable relay 620, in one embodiment, is a solid state relay that controls the power into the external current charger. Using the information collected by the system controller 610, if the charge control module 611 perceives that any of the batteries reach the limit of maximum allowable charge parameters (i.e., unsafe charging limits; e.g., exceeding a threshold temperature value, exceeding an upper threshold voltage value, exceeding an upper threshold current value, etc.), the solid state relay 620 turns off the external current charger 625 until all battery cells are within safe charging limits.

Similarly, the balancing control module 612 of the system controller 610 controls balancing charge functions of the charge balancers 630. The charge balancer 630, in one embodiment, controls of a group of four battery cells. The charge balancer 630 controls the power from the external charger 625 to the battery cells 631. As discussed above, the charge control is done by either allowing all of the current from the external charger 625 to go into a particular battery cell, or by converting all of the power to heat energy. This enables the charge balancer 630 to control the charging of each battery separately as long as the maximum needed power difference is within the limits of the heat dissipation.

In some instances, where the maximum needed power difference of one or more battery cells is not within the limits of heat dissipation of associated heat sinks, the system controller 601 controls the external charger 625 such that the external charger 625 cycles the charge current to compensate for the difference exceeding the limits. In such instances, normally, the charger cycling needs to be done only two or three times, after which the charge balancers 630 handle the required charging difference.

The system controller 610, in some embodiments, includes another charge control module 613. The charge control module 613 obtains the various cell parameter levels form the balancing control module 612, and computes the necessary charge requirements for each battery cell. The balancing control module also monitors the number of battery cells installed in each group of battery cell pack. When the number of batteries increases, the charge control module automatically increases the cutoff voltage of the system to account for the additional battery cell.

The system controller 610, in some instances, also includes an SoC module 614 to record and monitor a capacity of each battery cell. The SoC module 614 learns the capacity of each battery cell after a few cycles of charging the battery cells.

In some instances a battery enable relay 635 is included between the battery cells 631 and the motor controller 640. The system controller 610 controls the battery enable relay 635 such that the power from the battery cells 631 to the motor controller 640 is interrupted if any of the battery cells reaches the limit of maximum allowable parameters (e.g., lower than a threshold voltage value, lower than a threshold current value, over temperature, etc.). The battery enable relay 635 turns off the power to the motor controller 640 until the battery parameters are within safe operating limits. In one embodiment, an option is provided to require the motor vehicle to be entirely switched off and then switched on again before the battery enable relay 635 is turned back on.

In one embodiment, the system controller 610 also controls a throttle 648 to the motor controller. In some instances, the throttle control 645 includes a battery low relay 646 and a throttle limits resistor 647. The battery low relay 646 and the throttle limit resistor 647 allow limiting the throttle 648 when the batteries are low. This prevents the battery levels from going below a threshold value, thus protecting the batteries from damage. When the throttle control 645 reduces the throttle, the motor vehicle experiences degradation in performance before completely shutting off. This also allows the vehicle to travel a much larger distance with the last few percent of the battery power as it reduces the peak load on the batteries. Without the throttle control 645, the peak battery load would cause the battery voltage to drop to low charge levels, causing the vehicle to shut down without any warning, and also causing permanent damage to the battery cells.

In some instances, the system controller 610 includes a data logger 615 to maintain a log of cell parameter values. Examples of such cell parameter values include voltage value of each battery cell, current value of each battery cell, temperature of the batteries, sample rate (e.g., one second sample rate) of the battery cells, etc. The system controller 610, in one embodiment, connects to a memory (e.g., a flash memory) to store this information.

The system controller 610, also includes interfaces to display the data or to communicate the data to a computer for further processing. In one embodiment, the system controller 610 includes an SoC display 660 to indicate the status of the various components controlled by the system controller 610. For example, the SoC display 660 includes a pulse or digital output to indicate a level of the gas gauge. Other examples include having a low-battery light indicator, an LCD display of various cell parameter levels, an LED matrix to indicate charge level of each battery cell, a serial link to additional display devices (e.g., a TV screen), etc.

In some embodiments, the system controller 610 also includes an interface 670 to enable a user to monitor the battery management system using a computer. In one instance, the interface 670 is a serial interface. In other instances, the interface 670 includes an Ethernet interface. The interface is useful to upload the data onto, for example, a computer 680 to review log data. In one embodiment, the computer 680 can be connected to the system controller 610 using a network (e.g., the internet) to allow remote access and monitoring of the system controller 610.

FIG. 7 is a flow chart illustrating a method for individualized charging of multiple battery cells. In one embodiment, a total charge current from an external charger is fed into a first power balancer of a balancing charger 701. The first power balancer regulates a total amount of current applied to a particular battery cell 705. The first power balancer, in some embodiments, is a power transistor operating in linear mode. This first power balancer is controlled by a microcontroller as to how much current the power balancer should allow to be applied to the particular battery cell. In some instances, the microcontroller is a PID controller. The microcontroller is first used to determine a current charge level of the particular battery cell 710. It is then determined whether the charge level of the battery cell is lower than a predetermined charge level 720.

If the particular battery cell is lower than the predetermined level, the microcontroller controls a balancing current of the first power balancer such that the effective charge current applied to the particular power balancer is relative to the charge level of the particular battery cell 740. The balancing current of the first power balancer is varied in an amount proportional to the effective current applied to the particular battery cell. In some embodiments, the balancing current of the first power balancer is dissipated in the form of heat energy by means of a heat sink associated with the first power balancer 750.

If the particular battery cell is determined to be fully charged, as indicated in 730, then all of the total charge current is applied as balancing current within the first power balancer 745, and consequently, all of the power is dissipated as heat energy through the heat sink.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

I claim the following:

1. An apparatus for providing balanced and individualized charging to each battery cell in a plurality of battery cells, the apparatus comprising:
    a first power balancer configured to regulate a charge current applied to a first battery cell of the plurality of battery cells; and
    a microcontroller configured to monitor a charge level of the first battery cell, wherein the microcontroller controls the first power balancer such that an effective amount of the charge current applied to the first battery cell is proportional to the charge level of the first battery cell, and wherein an unused portion of the charge current is dissipated as heat energy through a heat sink associated with the first power balancer.

2. An apparatus for providing balanced and individualized charging to each battery cell in a plurality of battery cells as recited in claim 1, wherein the unused portion of the charge current is a difference between the charge current and the effective amount of the charge current.

3. An apparatus for providing balanced and individualized charging to each battery cell in a plurality of battery cells as recited in claim 1, wherein the first power balancer is a transistor device.

4. An apparatus for providing balanced and individualized charging to each battery cell in a plurality of battery cells as recited in claim 3, wherein the transistor device includes at least one of a bipolar junction transistor, a power transistor, or an epitaxial transistor, or a metal-oxide semiconductor transistor.

5. An apparatus for providing balanced and individualized charging to each battery cell in a plurality of battery cells as recited in claim 1, wherein the first battery cell is at least one of: a Lithium-ion battery cell, a Nickel-Zinc battery cell, a Nickel Metal Hydride cell or a Lead-acid cell.

6. An apparatus for providing balanced and individualized charging to each battery cell in a plurality of battery cells as recited in claim 1, wherein the plurality of battery cells are connected in series.

7. An apparatus for providing balanced and individualized charging to each battery cell in a plurality of battery cells as recited in claim 1, wherein the microcontroller is a PID controller.

8. An apparatus for providing balanced and individualized charging to each battery cell in a plurality of battery cells as recited in claim 7, wherein the microcontroller monitors the charge level and controls the first power balancer using PID algorithms.

9. An apparatus for providing balanced and individualized charging to each battery cell in a plurality of battery cells as recited in claim 1, wherein the first power balancer receives the charge current and in response generates a balancing current and an effective charging current, wherein the effective charging current is applied to the first battery cell and the balancing current is dissipated as heat energy through the heat sink associated with the first power balancer.

10. An apparatus for providing balanced and individualized charging to each battery cell in a plurality of battery cells as recited in claim 9, wherein the microcontroller controls the first power balancer such that the effective charging current is proportional to the charge level of the first battery cell, and wherein the balancing current is the unused portion of the charging current that is subsequently dissipated as heat energy.

11. An apparatus for providing balanced and individualized charging to each battery cell in a plurality of battery cells as recited in claim 10, wherein a battery jumper is used to dissipated the heat energy generated by the first power balancer.

12. An apparatus for providing balanced and individualized charging to each battery cell in a plurality of battery cells as recited in claim 1, further comprising:

a second power balancer to regulate a charge current applied to a second battery cell of the plurality of battery cells, wherein the second battery cell is connected in series to the first battery cell, and wherein the microcontroller individually monitors a charge level of the second battery cell and controls the second power balancer such that an effective amount of charging current applied to the second battery cell is proportional to the charge level of the second battery cell.

13. An apparatus for providing balanced and individualized charging to each battery cell in a plurality of battery cells as recited in claim 12, wherein the microcontroller controls the first power balancer and the second power balancer such that a final charge level of the first battery cell is balanced against a final charge level of the second battery cell.

14. An apparatus for providing balanced and individualized charging to each battery cell in a plurality of battery cells as recited in claim 1, further comprising:

an optical isolator for the first power balancer, wherein the optical isolator prevents a failure of the first power balancer to propagate to the microcontroller.

15. An apparatus for providing balanced and individualized charging to each battery cell in a plurality of battery cells as recited in claim 1, the apparatus further comprising:

a temperature sensor, wherein the temperature sensor senses an overall temperature of the plurality of battery cells.

16. An apparatus for providing balanced and individualized charging to each battery cell in a plurality of battery cells as recited in claim 1, the apparatus further comprising:

a status indicator, wherein the microcontroller controls a status information that is outputted by the status indicator.

17. An apparatus for providing balanced and individualized charging to each battery cell in a plurality of battery cells as recited in claim 1, wherein the microcontroller logs cell parameter values corresponding to the first battery cell.

18. An apparatus for providing balanced and individualized charging to each battery cell in a plurality of battery cells as recited in claim 17, wherein the cell parameter values include at least one of:

a voltage level of each of the plurality of battery cells;
a current level of each of the plurality of battery cells;
a temperature level of each of the plurality of battery cells; or
a charge rate of each of the plurality of battery cells.

* * * * *